US011890588B2

(12) United States Patent
Litner et al.

(10) Patent No.: US 11,890,588 B2
(45) Date of Patent: Feb. 6, 2024

(54) PERSONAL COSMETIC DISPENSER

(71) Applicants: Jason Litner, Calabasas, CA (US); Andrew Bowen, Seattle, WA (US)

(72) Inventors: Jason Litner, Calabasas, CA (US); Andrew Bowen, Seattle, WA (US)

( * ) Notice: Subject to any disclaimer, the term of this patent is extended or adjusted under 35 U.S.C. 154(b) by 466 days.

(21) Appl. No.: 17/172,559

(22) Filed: Feb. 10, 2021

(65) Prior Publication Data

US 2021/0268458 A1 Sep. 2, 2021

Related U.S. Application Data

(60) Provisional application No. 62/982,747, filed on Feb. 27, 2020.

(51) Int. Cl.

*B01F 33/84* (2022.01)
*A45D 44/00* (2006.01)
*A45D 34/00* (2006.01)
*B01F 35/71* (2022.01)
*B01F 101/21* (2022.01)

(52) U.S. Cl.

CPC ............ *B01F 33/848* (2022.01); *A45D 34/00* (2013.01); *A45D 44/005* (2013.01); *B01F 33/846* (2022.01); *B01F 33/8442* (2022.01); *B01F 35/7174* (2022.01); *A45D 2034/005* (2013.01); *A45D 2200/056* (2013.01); *A45D 2200/058* (2013.01); *B01F 2101/21* (2022.01)

(58) Field of Classification Search

CPC .................. A45D 34/00; A45D 44/005; A45D 2200/058; A45D 2034/005; B01F 2101/21; B01F 33/8442

See application file for complete search history.

(56) References Cited

U.S. PATENT DOCUMENTS

| | | | | |
|---|---|---|---|---|
| 5,934,344 A | 8/1999 | Wainberg | B01F 33/84 | 222/164 |
| 5,938,080 A | 8/1999 | Haaser | B01F 35/8822 | 222/144.5 |
| 7,185,789 B2 | 3/2007 | Mink | B01F 35/7174 | 222/135 |
| 11,666,133 B2 * | 6/2023 | Matsui | B01F 35/2115 | 222/145.5 |
| 2005/0189037 A1 | 9/2005 | Cortes Ferriz | B01F 35/71805 | 141/102 |
| 2006/0118581 A1 | 6/2006 | Clark | B67D 1/0041 | 222/333 |
| 2008/0029541 A1 | 2/2008 | Wallace | B67D 1/0021 | 222/207 |

(Continued)

*Primary Examiner* — Timothy R Waggoner

(74) *Attorney, Agent, or Firm* — MARK A. Litman & ASSOCIATES P.A.

(57) ABSTRACT

A custom cosmetic dispensing device includes a communication enabled automated dispenser for dispensing a user-specified cosmetic product. The dispenser has a housing with a plurality of liquid-ingredient cartridges removably coupled to a motor, each cartridge used to dispense a processor memory specified volume of liquid-ingredients. The dispenser interfaces with a software application that accepts, stores and interprets user inputs, assists users in custom formulation, and relays said inputs to the device controller unit for production of a customized cosmetic formula. A collection container may be used for immediate, stored or transported final compositions.

9 Claims, 8 Drawing Sheets

(56) References Cited

U.S. PATENT DOCUMENTS

| | | | | |
|---|---|---|---|---|
| 2008/0257446 | A1 | 10/2008 | Oakes | B01F 33/8442 141/94 |
| 2008/0305241 | A1 | 12/2008 | Trevino, III | B01F 35/881 700/239 |
| 2009/0145926 | A1 | 6/2009 | Klopfenstein | B67D 1/07 222/383.2 |
| 2010/0185322 | A1* | 7/2010 | Bylsma | A61M 35/003 222/145.5 |
| 2013/0074982 | A1 | 3/2013 | Echterling | B01F 29/322 141/10 |
| 2013/0255831 | A1 | 10/2013 | Shibasaki | G16H 20/13 141/69 |
| 2015/0107678 | A1* | 4/2015 | Igarashi | G05D 7/0617 137/565.16 |
| 2015/0314246 | A1 | 11/2015 | Lehtonen | B01F 33/452 700/265 |
| 2016/0052007 | A1* | 2/2016 | Fuller | A45D 34/00 222/638 |
| 2017/0246602 | A1 | 8/2017 | Dean | B01F 35/2205 |
| 2018/0280277 | A1* | 10/2018 | Lu | G16H 20/13 |
| 2019/0143285 | A1 | 5/2019 | Sang | B01F 35/881 366/141 |
| 2020/0215568 | A1* | 7/2020 | Waldo | A45D 40/24 |
| 2021/0024243 | A1 | 1/2021 | Bourne | |
| 2021/0024343 | A1* | 1/2021 | Pettipher | B67D 1/0879 |
| 2022/0212153 | A1* | 7/2022 | Oh | B01F 33/84 |

* cited by examiner

PERSONAL COSMETIC DISPENSER

RELATED APPLICATION DATA

This application claims priority from U.S. Provisional Patent Application Ser. No. 62/982,747.

BACKGROUND OF THE INVENTION

1. Field of the Invention

This invention relates to a device and method for production of a custom cosmetic composition based on user-specified preferences. The device is intended for countertop use to formulate on-demand, customized cosmetic compositions.

2. Background of the Art

Typically, the cosmetics industry has provided for retail sale of pre-packaged, pre-formulated cosmetic compositions. These one-size-fits-all formulations are not ideal for all consumers, and many consumers struggle to find the right products for their unique needs and wants. As a result, there is increasing consumer interest in personalized cosmetic offerings that will satisfy their desire for user-controlled cosmetic product specifications, including desired color, coverage level, texture, finish (e.g., gloss vs. matte), effects (e.g., pearlescent effects pigments), and use of ingredients appropriate for their skin types (e.g., oily vs. dry skin).

In addition, as consumer demand grows for more diversified and unique product offerings, manufacturers are faced with increasing inventory carrying costs associated with expanded product ranges, each serving progressively smaller market segments. Such diversification risks becoming cost prohibitive using conventional manufacturing practices. As such, there is a need for a solution that allows for satisfaction of diverse and unique consumer demands in a more cost-effective manner.

Prior art exists for such devices primarily intended for retail point-of-sale custom cosmetic formulations. These primarily relate to production of custom color-matched foundations and color cosmetic products such as nail enamel. Other online services allow users to specify some product features and to receive a curated product in the mail. These devices and services fail to provide the degree of control, choice, and convenience craved by modern consumers. The few available at-home solutions have other associated limitations described below.

U.S. Patent Application No. 2019/0377368 by Besen et al. discloses a custom cosmetic dispenser that is clearly intended for in-store use whose design is too cumbersome to be adapted to at-home personal use.

U.S. Patent Application No. 2019/0200733 by Thiebaut et al. discloses an apparatus for personalizing cosmetic compositions based on a handheld microfluidic design. The design is focused on portability and is configured for production of a single use cosmetic application. Thus, it will not allow for effective storage and preservation of a larger travel quantity of a desired product, making it inconvenient for many users having to carry the device at all times.

U.S. Pat. No. 10,366,513 by Nichol et al. discloses a portioning machine with external reservoirs for providing a custom cosmetic. This device is likewise clearly designed for retail use and is too cumbersome to be adapted to at-home personal use.

U.S. Pat. No. 10,022,741 by Fuller et al. discloses an apparatus for selectively dispensing fluids to create a personalized skincare regimen. Mixing is accomplished with a static mixer that may not be ideal to achieve sufficient mixing of high viscosity ingredients such as those found in color cosmetics. In addition, the design is configured for production of a single use cosmetic application and will not allow for effective storage and preservation of a larger travel quantity of a desired product, adding to the inconvenience of the design.

U.S. Pat. No. 9,808,071 by Thiebaut et al. discloses an apparatus for dispensing cosmetic material through a manifold into a detachable container. As designed, the machine houses just three ingredient cartridges requiring the use of pre-mixed colorant mixtures that limit the range of custom cosmetic features able to be produced by this system (e.g., cannot control coverage level). The ability to produce a wide variety of finished products such as foundations and lip products would require frequent substitution of cartridges, proving excessively inconvenient for consumer home use. The variety of product options required to satisfy consumers' desire for novelty would necessitate a much greater number of ingredient cartridges than those provided in this design. In addition, the design is configured for production of a single use cosmetic application and will not allow for effective storage and preservation of a larger travel quantity of a desired product, adding to the inconvenience of the design. As the container is not an airless system, storage of product for any length of time will risk product oxidation, deterioration, and color change. Furthermore, the design utilizes expensive and/or complicated mechanisms such as optical encoders and gear-dependent lead screws, potentially increasing the finished cost and limiting marketability to cost-conscious consumers.

U.S. Pat. No. 9,691,213 by Bartholomew et al. discloses a retail point-of-sale device that uses a robotic arm to produce a custom color cosmetic product. This device is intended for in-store use and its design is clearly too cumbersome to be adapted to at-home personal use.

U.S. Pat. No. 9,671,795 by Igarashi et al. likewise discloses a retail point-of-sale device intended to produce color-matched foundations in-store. The claims disclose use of a color-measuring device configured to acquire a color composition of a target that is utilized by a foundation software module to match the color composition to a custom cosmetic product. The device uses peristaltic pumps that were largely developed for medical and laboratory single use with disposable tubing. These would have several disadvantages for a personal device that is designed for frequent user-specified formulation changes. Peristaltic pump mechanisms are prone to tube wear. If tubing is not replaced regularly, these pumps can suffer from unacceptable degradation in accuracy and efficiency, resulting in unacceptable tolerances for the micro-fluid volumes required for at-home dosing. In addition, their pulsating dispense can cause splashing. Tubing is also difficult to clean and replace in a closed system, resulting in unacceptable maintenance requirements for a personal consumer product. Finally, smaller scale peristaltic pumps are expensive and would potentially add significantly to the finished cost.

U.S. Pat. No. 7,445,372 by Engel et al. discloses a liquid dispensing machine for personal use that also makes use of a spinning element contained within the housing for mixing of the dispensed liquids. The spinning element as designed is not ideal for mixing of high viscosity ingredients as can be found in many cosmetic formulations. In addition, since many cosmetic formulations specify exceedingly small colorant volumes, retention of any colorant ingredient within the housed mixing chamber may unacceptably alter the color composition of the end product. As designed, the machine comprises just four pumps for four ingredient cartridges that would severely limit the type and variety of custom cosmetic products able to be produced by this system. The variety of product options required to satisfy consumers' desire for novelty would necessitate a much greater number of ingredient cartridges than those provided in this design.

U.S. Pat. No. 6,935,386 by Miller et al. discloses an automated cosmetics dispenser for retail point-of-sale cosmetics products using a nutating pump with rotating disc or turntable to move a container under each nozzle for individual dispensing. Such a design would also be too costly, cumbersome and unsuitable for home use.

U.S. Pat. No. 6,856,861 by Dirksing et al. discloses an apparatus for providing personalized cosmetics. Although the apparatus is designed for at-home use, it uses a dispensing and mixing technology that make the design unsuitable for a personal consumer product. Once the appropriate fluids are released from the cartridges, they are pushed through a piping system and ejector to be dispensed. As with the patent to Engel et al. above, such a mixing design is unsuitable for dispensing of color cosmetic formulations. Since many cosmetic formulations specify exceedingly small colorant volumes, retention of any colorant ingredient within the housed piping system may unacceptably alter the color composition of the end product.

The known related art fails to disclose the principles of the present invention. In short, the prior art fails to disclose a comprehensive, technology-driven, at-home solution that will allow users to create the full plethora of desired liquid cosmetic products (e.g., foundation, concealer, highlighter, contour, lip product, blush, eyeshadow, etc.) in a convenient and cost-efficient form factor. Users should be able to control every aspect of their desired cosmetic, including color, coverage, texture, finish, ingredients, and effects. Moreover, users should be able to effectively preserve and store a quantity of their preferred products at a volume comparable to what is currently available in the retail setting. In view of the foregoing, there is a need for such a user-specified custom cosmetic solution provided in a small footprint and able to allow convenient, fast, and reproducible at-home custom cosmetic dispensing.

The documents cited in this application are incorporated in their entireties by reference herein.

SUMMARY OF THE INVENTION

The aforementioned problems are overcome by the present invention which specifies a custom cosmetic dispensing device comprising a wireless-enabled automated dispenser for dispensing a user-specified cosmetic product. The dispenser comprises a housing containing one or more of a plurality of liquid ingredient cartridges removably coupled to a plurality of motors, each used to dispense a specified volume of said ingredients. The dispenser interfaces with a software application that accepts, stores and interprets user inputs, assists users in custom formulation, and relays said inputs to the device controller unit for production of a customized cosmetic formula. The software application allows for retention and transmission of user data and preferences and allows for multiple users of one device to facilitate simple dispensing of preferred products. The software application also assists with inventory control and convenient ordering of ingredients from the company's e-commerce site by providing alerts to users when ingredients levels are low.

A customizing and dispensing device for custom cosmetics may include:

- an automated dispenser containing at least two liquid-containing ingredient cartridges;
- each of the at least two cartridges removably coupled to a motor able to dispense controlled amounts of contained liquid from a respective liquid-containing ingredient cartridge;
- the motor linked in communication with a processor with memory;
- at least one user input control (which could be as simple as an on-off switch or actual data input selection controls);
- the user input control in communication with the processor to direct activation and control of the coupled motor;
- the processor having an external input-output wired or wireless communication link engageable with a source of data transmission;
- the memory configured to store at least one set of instructions to activate motors to dispense specific amounts of the liquid from the respective liquid-containing ingredient cartridges;
- output piping or a nozzle from each of the respective liquid-containing ingredient cartridges leading to a manually moveable receiving chamber; and
- at least the output piping or nozzle and receiving chamber within a housing having surrounding vertical walls, a coupling for supporting the at least two respective liquid-containing ingredient cartridges (there may also be a spring-loaded ejection system, as is typically found in printer/toner cartridges, so that upon activation, the cartridge is ejected), a lower support surface to support the receiving chamber to receive the moveable containers for the programmed cosmetic materials generated), and an opening in the surrounding vertical walls enabling manual removal of the removeable receiving chamber.

DETAILED DESCRIPTION OF THE INVENTION

Figure 1:
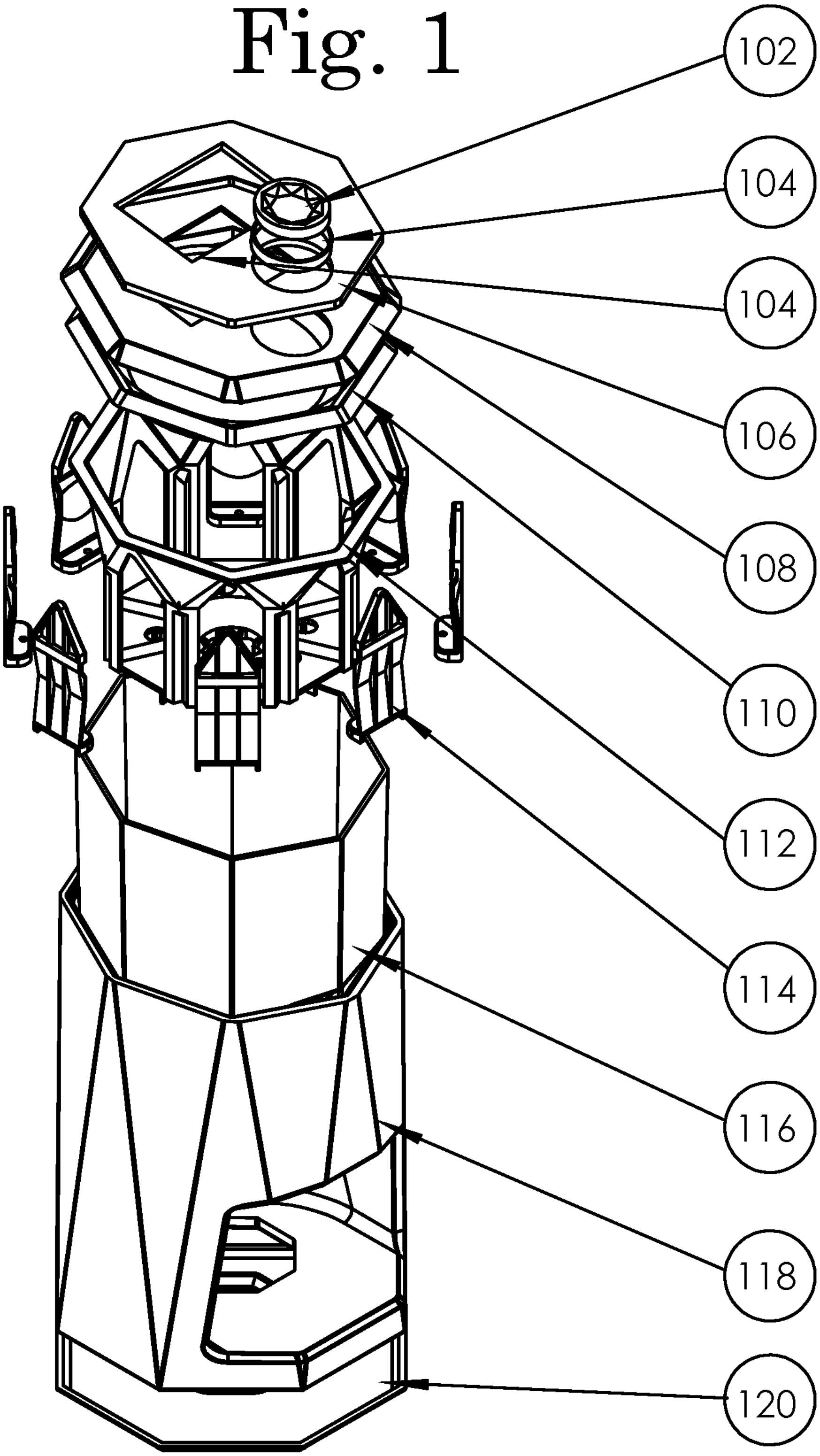
FIG. 1 is a perspective view of the exterior of the dispensing device with a button data entry system.

A customizing and dispensing device for custom cosmetics includes:

an automated dispenser containing at least two liquid-containing ingredient cartridges, each of the at least two cartridges removably coupled to a motor able to dispense controlled amounts of contained liquid from a respective liquid-containing ingredient cartridge;

the motor linked in communication with a processor with memory;

at least one user input control;

the user input control in communication with the processor to direct activation and control of the motor with respect to a respective liquid-containing ingredient cartridge;

the processor having an external input-output wired or wireless communication link engageable with a source of data transmission;

the memory configured to store at least one set of instructions to activate the motor to dispense specific amounts of the liquid from the respective liquid-containing ingredient cartridges;

output piping from each of the respective liquid-containing ingredient cartridges leading to a manually moveable receiving chamber; and at least the output piping and receiving chamber within a housing having surrounding vertical walls, a coupling for supporting the at least two respective liquid-containing ingredient cartridges; a lower support surface to support the moveable receiving chamber, and an opening in the surrounding vertical walls enabling manual removal of the removeable receiving chamber.

The device has a lower support surface with a flat support surface with non-raised markings to align a bottom of the receiving chamber with an area below the output piping. A single stop line or stop shape may be provided to catch the back of the liquid ingredient-containing cartridge. A shape matching the bottom of the receiving chamber may also be used to position the receiving chamber. Each liquid ingredient-containing cartridge may be removably engaged with respect to a single motor that causes processor-controlled discharge of the individual liquids. The device has a memory which stores multiple proportional volumetric combinations of the liquids, and the device has a user input control which has selection capability to initiate a single combination for mixing of the liquids from among the multiple proportional combinations of the liquids.

The user input control has an alphanumeric, ikon, symbol, or textual display for identifying individual ones of the multiple proportional combinations of the liquids. The user input control may be a button, series of buttons or rotating switch that progresses through the multiple proportional combinations of the liquids or a touch display. A display panel may be on or in communication with the processor (e.g., communication may be to a personal device such as smart phone, pad, tablet or the like) that displays a color or number or name for the initiated single combination of liquids. The display panel may also be integrated on the machine (as a touch screen) and/or in communication with wireless device.

An alternative description of the present technology may be as a customizing and dispensing device for custom cosmetics which may include:

an automated dispenser containing at least two liquid-containing ingredient cartridges, each of the at least two cartridges may be removably coupled to a motor (or motors) driven gear pump able to (for example, create reduced pressure within the dispenser) draw and dispense controlled amounts of contained liquid from a respective liquid-containing ingredient cartridge into a respective nozzle specific to a single contained liquid. Alternative motors and pumps may be used, such as a propeller-driven motor, screw driven motor, direct (pneumatic or hydraulic) pressure-driven motors. Alternative motors and pumps may have different names such as Rotary Pumps. gear pumps (external or internal), screw pumps, progressing cavity pumps, roots-type pump, peristaltic pump, lobe pump, rotary vane pump, etc. The motors should be electrical with either an outside power connection, internal exhaustible battery or internal rechargeable battery.

Each motor and coupled gear pump is linked in communication with a processor with memory. At least one user input control is on an external surface of the dispensing device. The panel should have manual controls to switch from individual recipes or compositions at the choice of the user, and there should be a visual display of numbers, colors or composition names that a user can relate to specific color choices available from memory.

The user input control in communication with the processor is to direct activation and control of each coupled motor-driven gear pump according to an order and percentage of liquid to be used in any single specific composition and color selected.

The processor has an external input-output wired or wireless communication link engageable with a source of data transmission. Any wired or wireless communication link can be used, such as: LAN, WAN, Bluetooth, Apple, Sysco and any other commercial systems.

The memory is configured to store at least one set of instructions (at least two and storage of ten or a hundred or more compositions is more likely) to activate motors to dispense specific amounts of the individual liquid-compositions from the respective liquid-containing ingredient cartridges into the respective nozzles. The nozzles from each of the respective liquid-containing ingredient cartridges leading to a manually moveable receiving chamber; and at least the respective nozzles and receiving chamber positioned within a housing having:

a) surrounding vertical walls;

b) a coupling for supporting the at least two respective liquid-containing ingredient cartridges;

c) a lower support surface to support the moveable receiving chamber, and d) an opening in the surrounding vertical walls enabling manual removal of the removeable receiving chamber.

The above device may have each respective liquid-containing cartridge comprise a piston slideably engaged within a liquid-containing reservoir, the motor-driven gear pump positioned at a bottom of the reservoir to withdraw liquid in the reservoir into the respective nozzles.

The device may include a trough within the device between the reservoir and the nozzles, each reservoir depositing liquid into and through the trough before being dispensed through the nozzle. This trough area was designed to reduce constraint on fluid flow, transport the fluids into the nozzles and not necessarily for containment of fluids The motor-driven gear pump may be connected to an external coupler through a pin, the external coupler driven by a single motor within the device, and the external coupler rotating the pin, which then drives the motor-driven gear pump within the respective liquid-containing cartridge. The engaging function between couplers (disc-like elements, pins, cylindrical elements) on the pump and motors need not be a tooth-engaged gear, but may connect through friction engagement (such as abrasion-grit coated surfaces and roughness) as the contact does not need to be perfectly aligned, should be slip free and still does not require teeth to connect.

The respective nozzles may have a self-closing diaphragm distal from the reservoir that opens with increased liquid pressure within the respective nozzle and closes when liquid pressure within the respective nozzle ceases.

Another aspect of the present technology is as a method of customizing and dispensing custom cosmetics from a mechanical device comprising:

entering a command from a user control to an electric motor;

the electric motor being switchably engageable with one liquid containing cartridge at a time from among at least two separate liquid containing cartridges, each of the liquid-containing cartridges containing a different colored liquid cosmetic composition, or individual motors may be associated with each pump so that individual pumps may be contemporaneously or sequentially activated;

the command from the user accessing a single specific set of motor operations from a memory in the mechanical device that contains tables of possible combinations of the at least two separate liquid-containing compositions;

the motor directing delivery of one liquid at a time from a single liquid-containing cartridge at a time;

directed liquid flowing from a respective cartridge into a respective nozzle having a diaphragm tip at a bottom on the respective nozzle and into a receiving chamber which may be external or internal, fixed position or removable;

the respective nozzle being forced open upon an increase in pressure from a liquid being pumped into the respective nozzle and the diaphragm closing when there is a decrease in pressure from a liquid being pumped into the respective nozzle; and when a first liquid has been pumped into the receiving chamber, operation of the motor is transferred to pump an at least second liquid from an at least second cartridge into the receiving chamber. Individual pumps may be simultaneously activated in a number of ways to dispense multiple different liquids at the same time. The software may implement the positioning of differentially radius-sized cylindrical elements (the gear-like acting elements and posts) against a single motor, or multiple motors may separately engage each pump individually or in concert. With differential sizing (different radii) between the engaging respective elements between respective liquid-containing cartridges, or different energy input to the motors, or other speed adjustments, different rates of flow can be provided between the respective liquids, The engaging elements may be disengaged or depowered when the appropriate amount of respective liquids have been dispensed.

The method may be further advanced by each respective liquid-containing cartridge including a piston slideably engaged within a liquid-containing reservoir, the motor-driven gear pump positioned at a bottom of the reservoir to withdraw liquid in the reservoir into the respective nozzles and the command activating each individual gear pump is separately activated by the motor according to an ordered series of steps for each liquid-containing cartridge. The method may also include activation of the gear pump withdrawing liquid from the liquid-containing cartridge into the respective nozzle and lowering a level of liquid within the cartridge draws down a piston over the level of liquid within the cartridge. The primary purpose of the piston is to create an air tight cartridge and preserve liquids. It does not have to assist in pumping liquids as a piston pump would. However, it could add some limited amount of pressure to act as a bias, so that less pressure might be needed to be provided by the pumps, as the piston may provide a base pressure below that necessary to push liquid through the diaphragm.

Reference to the Figures will assist in an appreciation and understanding of the invention. All identical numbers in different Figures refer to identical or similar elements.

The custom dispensing device is a small footprint countertop wireless-enabled appliance. The device is configured to be controlled via either a wired or wireless interface, or via both wired and wireless systems. FIG. 1 shows a perspective view of the exterior of one embodiment of the dispenser enclosure consisting of an outer body 118, a top cap 106 over the data input/display area 108 and bottom cap 116, an optional encoder button 102, and optional integrated user interface display 105. Also shown are a collar 104, a top support ring 110, a bottom support ring 112 and snap locks 114 to lock in cosmetic component dispensers (not shown). Exterior wall components 116, 118 and 120 define an open area for insertion of collecting containers (not shown).

Figure 1A:
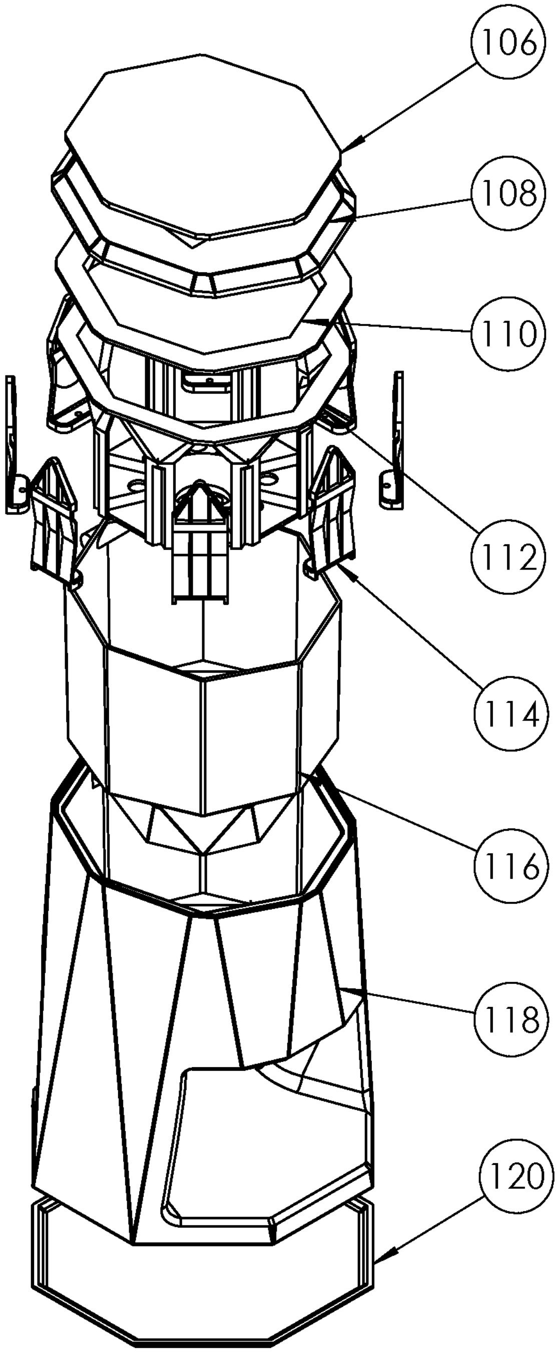
FIG. 1A is a perspective view of the exterior of the dispensing device with a flat panel data entry system.

FIG. 1A is similar to FIG. 1 except that there is a flat panel top cap 106 with the data input/display area 108.

Figure 2:
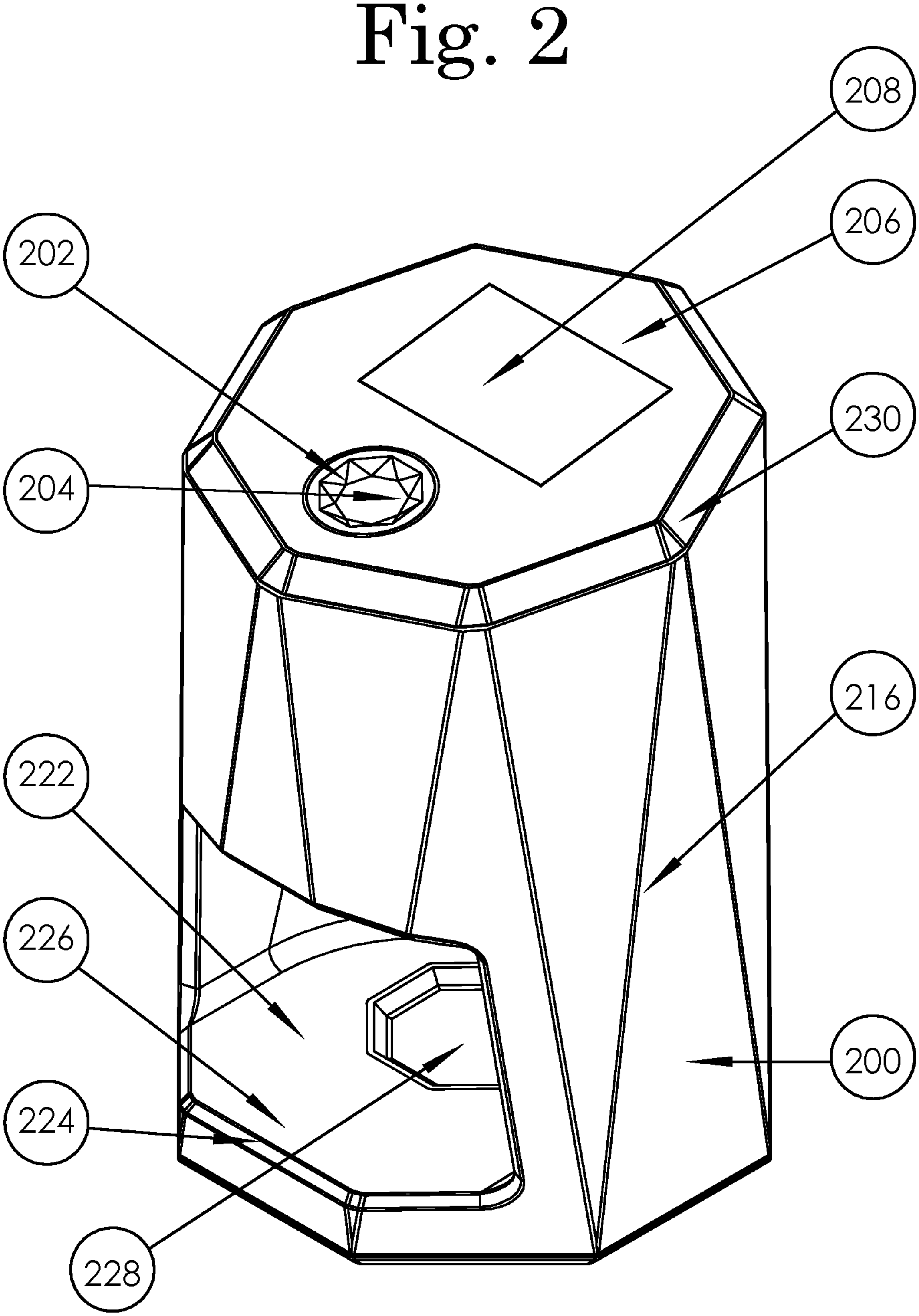
FIG. 2 is a detailed perspective view of the internal components of the dispensing device with a button data entry system.

FIG. 2 shows a detailed perspective view of the internal components of one embodiment of the device 200. An external device body 216 fits over a bottom cap 224. In one embodiment, the device body 216 is composed of a ceramic material but may be made from any high durability material including various plastics, aluminum or other metals, or other such material. The device body 216 houses an ingredient cartridge assembly (not shown) having an inner cartridge bay 228 and outer cartridge bay 222 that house the ingredient cartridges (not shown). Each ingredient cartridge (not shown) is located in proper position by a cartridge release arm (not shown) attached to the outer cartridge bay 222. The cartridge release arm (not shown) will serve to hold the cartridge down and in place from a spring-loaded ejector pin below the cartridge. When the lever is pulled back it will allow the pin to push the cartridge up for ejection. A cap top 206 and cap bottom 230 enclose the cartridge assembly and provide a closure for the device body 216. The cap top 206 has a display panel 208 which may replace the rotary encoder 202 as a touchscreen display panel 208 and input device and cap bottom 230 assembly also serve to house the system PCB (power control battery, not shown) and microcontroller (not shown). In one embodiment, an optional encoder button 202 with LED decoder lens 204 is housed within the cap assembly 205 and encircled by an LED encoder button lens 204. In this embodiment, the rotary encoder button 202 is a rotational switch knob, but may be any other type of control button or switch. In one embodiment, an optional glass or acrylic cap cover over or as the display panel 208 is contained within the cap assembly 205. In one embodiment, the top cap assembly 205 of the housing 216 contains a user interface touchscreen display panel 208 that may comprise one of many commonly encountered displays such as an LCD (Liquid Crystal Display) or LED (light-emitting diode) screen. In another embodiment, the user interface is confined to the smart device application software such as on a smartphone.

In FIG. 2, there is an outer cartridge bay 226 for holding containers (not shown) and for receiving delivered cosmetic ingredients (not shown) into the cosmetic containers (not shown). Also shown is an optional holding container stabilizer 228, here shown as a geometric (octagonal) depression, but which also may be raised ridges.

Figure 2A:
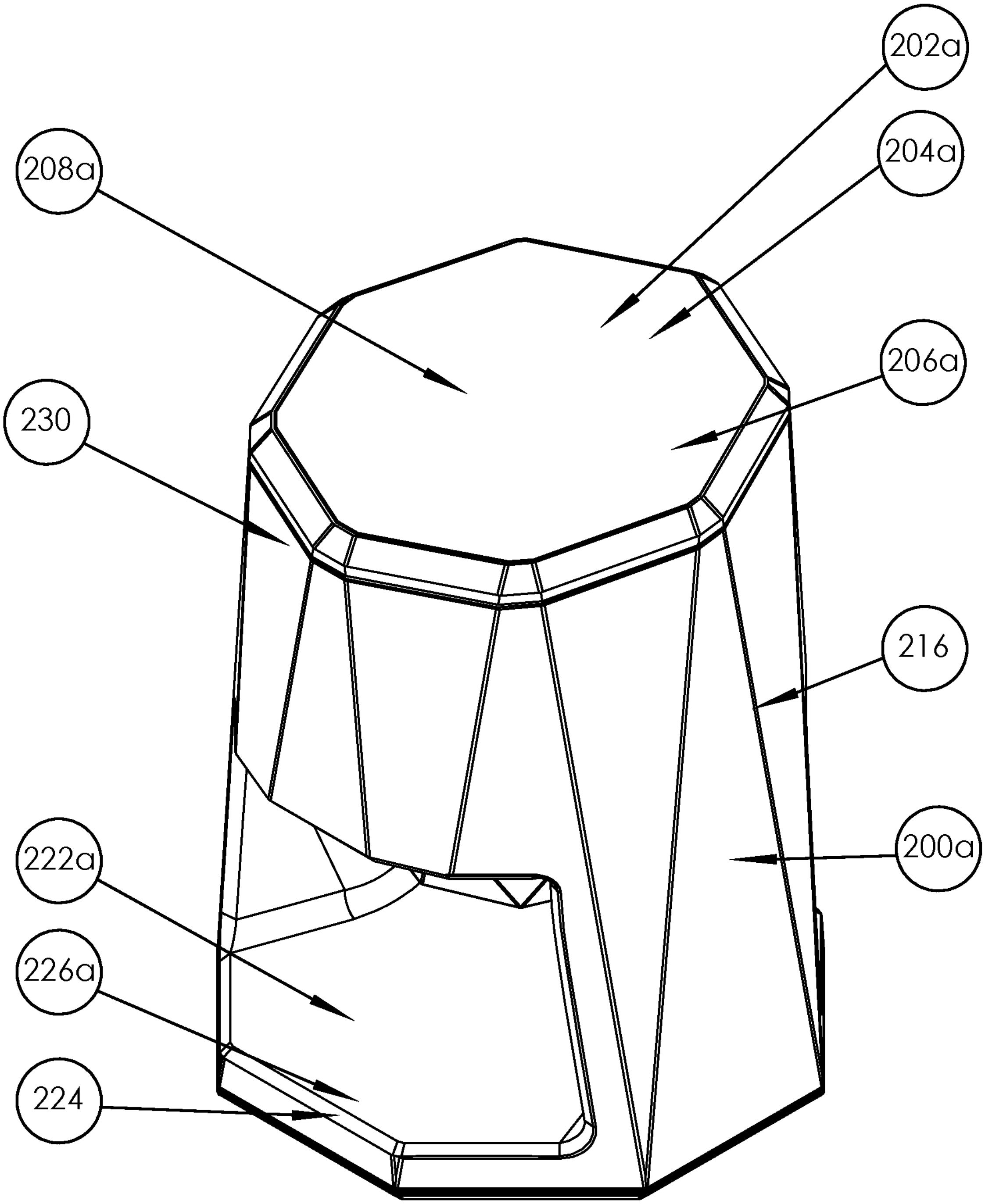
FIG. 2A is a detailed perspective view of the internal components of the dispensing device with a flat panel data entry system.

FIG. 2A shows a detailed perspective view of the internal components of one embodiment of the device 200*a*. An external device body 216 fits over a bottom cap 224. In one embodiment, the device body 216 is composed of a ceramic material but may be made from any high durability material including various plastics, aluminum or other metals, or other such material. The device body 216 houses an ingredient cartridge assembly (not shown) having an inner cartridge bay 222*a* and outer cartridge bay 226*a* that house the ingredient cartridges (not shown). Each ingredient cartridge (not shown) is located in proper position by a cartridge release arm (not shown) attached to the outer cartridge bay 222*a*. The cartridge release arm (not shown) will serve to hold the cartridge down and in place from a spring-loaded ejector pin below the cartridge. When the lever is pulled back it will allow the pin to push the cartridge up for ejection. A cap top 206*a* may be a transparent polymer (e.g., polycarbonate, polyolefin, polyester, etc.) or glass panel and cap bottom 230 is merely a support to enclose the cartridge assembly and provide a closure for the device body 216. The cap top 206*a* has a display panel 208 with a touch sensor 202*a* and an LED lens or display 204*a* under the cap top 206*a* which may replace the rotary encoder 202 (in FIG. 2) as a touchscreen display panel 208*a* mounted under the cap top 206*a* acting as a touch sensitive input and display mounted under the cap top 206*a* and input device and cap bottom 230 assembly also serve to house the system PCB (power control battery, not shown) and microcontroller (not shown). In this embodiment, the touch sensitive and display elements 202*a* 204*a* and 208*a* replace the rotary encoder button 202 (of FIG. 2), but may be any other type of touch sensitive control panel. In one embodiment, under the panel 206*a*, a user interface touchscreen display panel 208*a* that may comprise one of many commonly encountered displays such as an LCD (Liquid Crystal Display) or LED (light-emitting diode) screen may be present. In another embodiment, the user interface is confined to the smart device application software such as on a smartphone.

Figure 3:
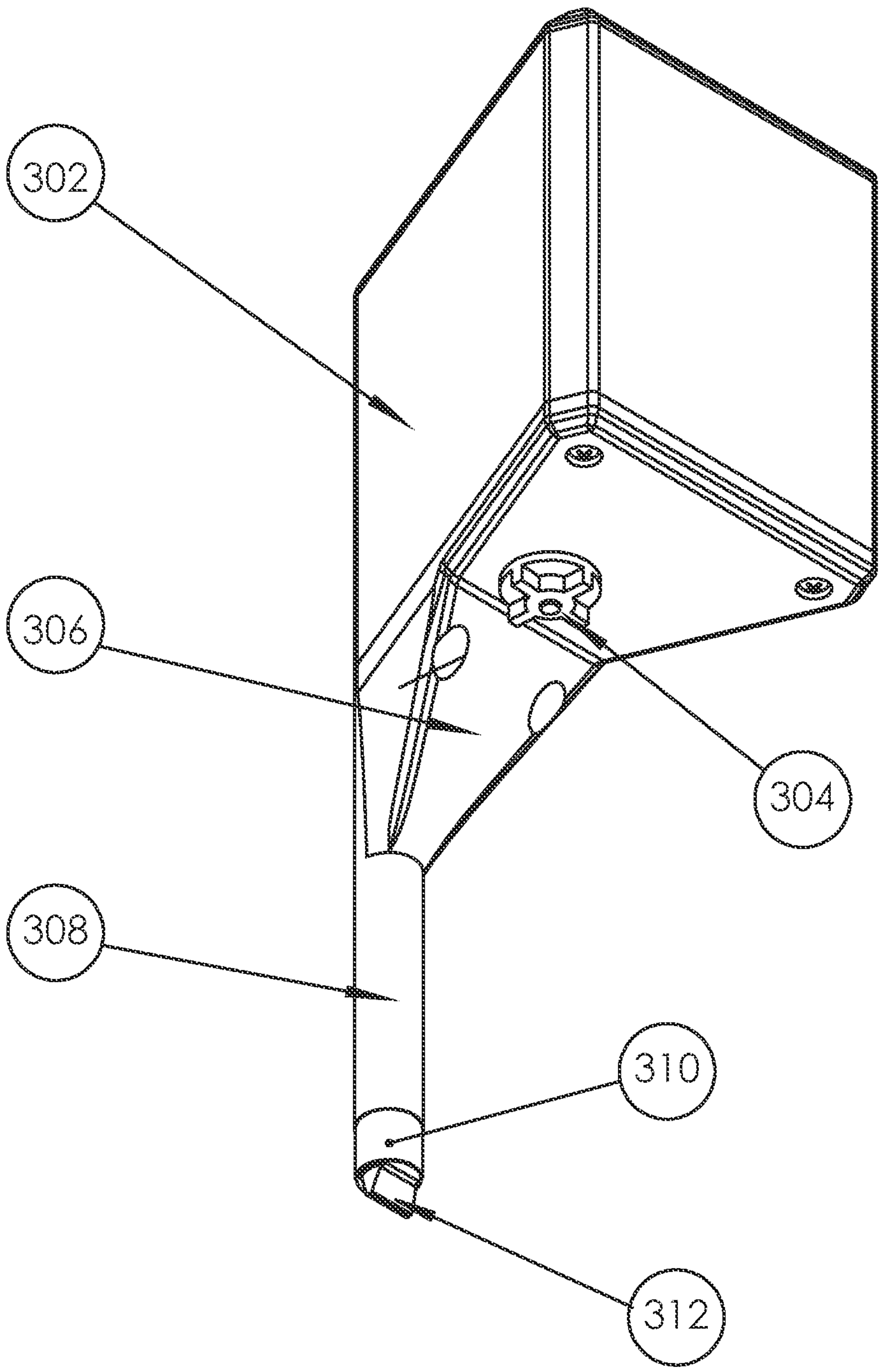
FIG. 3 is a perspective view of the exterior of the pump-cartridge assembly.

FIG. 3 shows a perspective view of the exterior of the pump cartridge assembly 302 with integrated dispenser nozzle 308. There is shown a motor coupler 304 for driving internal pumps (not shown) in the pump cartridge assembly 302. There is a pump bottom with connector 310 leading to the valve or flap 312 which assists in controlling flow of ingredients out of the pump cartridge assembly 302. A support and/or engaging plate 306 is shown within the aspect of the pump cartridge assembly 392.

Figure 4:
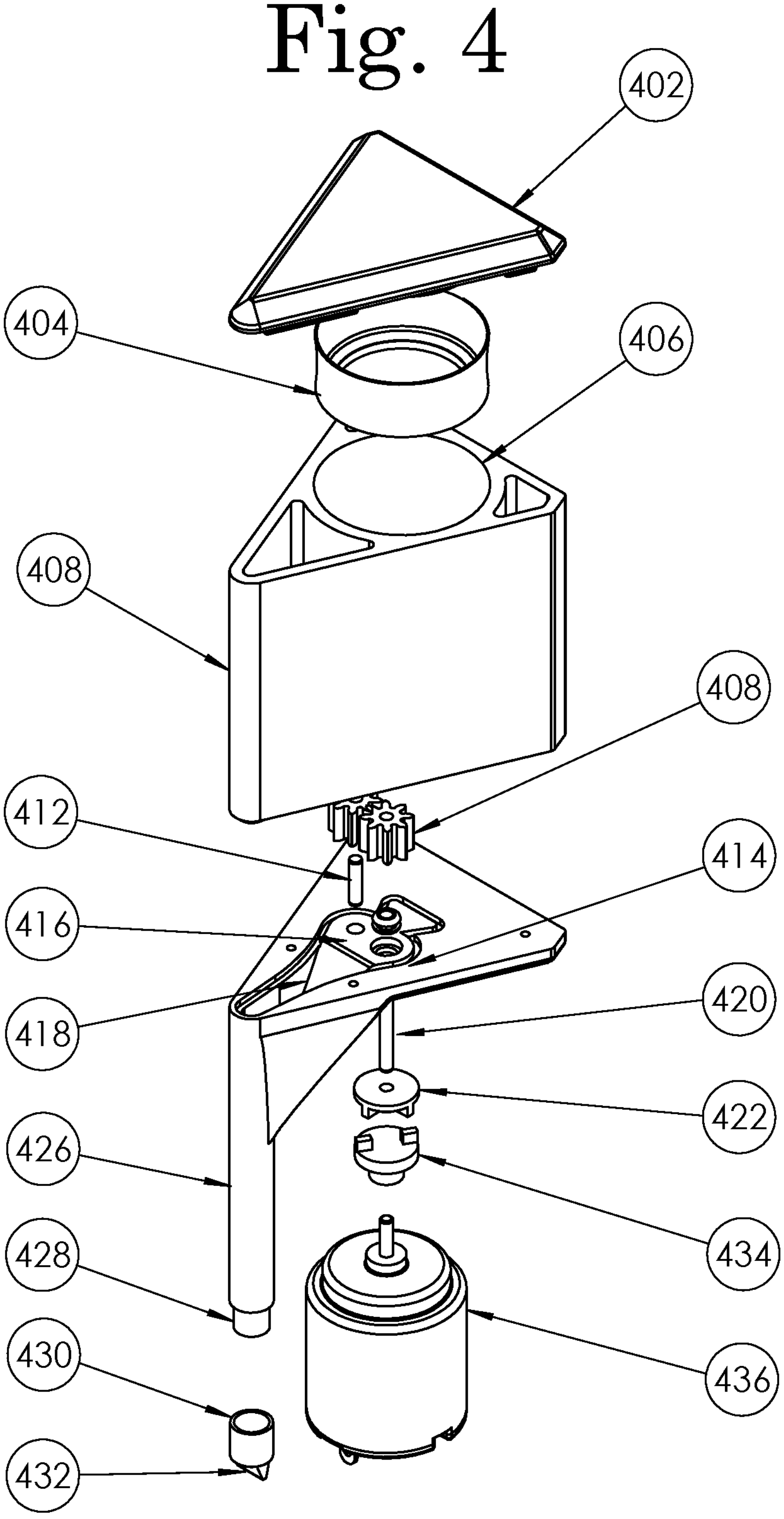
FIG. 4 is a detailed perspective view of the internal components of the pump cartridge assembly.

FIG. 4 shows a detailed perspective view of the internal components of the pump cartridge assembly 400. A pump top cap 402 is attached to a pump cartridge assembly bottom 408 via a connector 404 that seats within an opening 406 within the pump cartridge assembly bottom 408. The pump attaches to the pump motor via a pump motor coupler 4. A microcontroller engages the pump motor which through gears 410 turns the gear pin shaft driver 412 that then turns the stationary gear 420 through guide-plate 416. This, in turn, drives contents of the cartridge (not shown) through the attached integrated nozzle 426 via positive pressure displacement down trough 418. As cartridge contents are progressively evacuated, an internal piston 414 is displaced ensuring near total ingredient restitution and creating an airless vacuum chamber to help in preserving the ingredients. A pump lid or top cap 402 provides a cover for the pump apparatus. A duck bill valve 432 is attached through a female connector tip 430 at the nozzle outlet 428 ensures that the system remains airless at the outlet side of the integrated nozzle 426 while also reducing outlet pressure. Its self-closing nature also prevents excess material from dripping. Ingredient cartridges are airless containers designed to minimize contamination, oxidation, and degradation of housed contents.

A motor with a drive spindle 436 engages a gear 434 which in turn engages a drive 422 which rotates shaft 420 which in turn rotates contact drive 414 which rotates the gear pin shaft driver 412 which in turn drives the gears 410 which assist in providing pressure to the cosmetic component within the opening 406 to the liquid component volume.

In the preferred embodiment, one motor is designated for each ingredient cartridge unit so that the correct pump can be engaged by the control unit to allow for flow of the correct ingredient. In another embodiment, one motor may drive multiple interchangeable ingredient cartridge units. Ingredient cartridges may be easily attached and detached to the ingredient carousel via a click-type ejection lever or other common form of attachment for easy disposal and replacement of used cartridges. Ideally, the device will house as many ingredient cartridges as possible in order to maximize the number of unique formulations available and minimize inconvenience associated with changing out cartridges. In the preferred embodiment, the device may house 8 cartridges at one time, including primary colorants sufficient to formulate any color of base or accent cosmetic, as well as effects pigments to transmit the desired degree of shimmer, sheen, or other cosmetic effects. This will potentially allow far greater breadth of choice and control in determining a user's preferred formulation.

Users will have the ability to customize all aspects of their products, including color, coverage, texture, finish, ingredients, and effects. Once users have compiled one or more custom cosmetic formulas, these formulas are transmitted by the software application to the custom dispensing device control unit for production. The formulas may be saved and edited as needs or preferences change. In the preferred embodiment, coverage level will be controlled by varying the total volume of colorant material dispensed into the pre-loaded storage container. In an alternate embodiment, the container is not pre-loaded with base material but, rather, base material is dispensed from one of the cartridges. In the preferred embodiment, in the event that a user wishes to modify the color of a previously dispensed product, the software will provide for selection of a 'color shot' allowing dispensing or one or more multiples of a fixed volume of a single colorant at a time.

In the preferred embodiment, ingredients may be dispensed simultaneously into a mixing container placed on a base under the pump outlet nozzles. For reasons of speed and efficiency, a simultaneous dispensing mechanism is the preferred embodiment. The ingredient carousel may contain one or more of many available ingredient cartridges with liquid additives that may be dispensed together to form a custom cosmetic composition. For example, compositions from common cosmetic categories that may be produced include, but are not limited to: cleansers and makeup removers, toners, acne and anti-bacterial components, moisturizing components, anti-inflammatory components, anti-oxidant and anti-aging components, sebum-control components, skin lightening products, sun protective products, exfoliants, lip balms or other lip color products, face oils, body lotions, various face serums, face masks, lotions, and creams, pore correctors, tinting or bronzing products, foundations, primers, concealers, color correctors, contour products, highlighters, blushes, liquid eyeshadows, products that convey shimmer, and other makeup or cosmetic products. One familiar with the art will understand that any number of various products can be formulated using this device and should not be limited by this list. In one embodiment, the device is able to detect both the type and amount of ingredients contained in each ingredient cartridge by utilizing programmable radiofrequency identification (RFID), near field communication (NFC), or other similar technology for identification of ingredient-related information with each cartridge read by the device. In this embodiment, a remote RFID/NFC antenna is positioned inside the housing to wirelessly interact with the RFID/NFC tags embedded in each cartridge and with the controller module on the control board.

Instead, software monitoring the revolutions and run time of the motors, electronic switches, weight sensitive elements, pressure-sensitive elements, or internal light-reflecting sensors-receptors can be used to indicate volume levels in the cartridges. Information from the sensors create information which is relayed via the control board through the software application to alert users to near-empty cartridges and to ensure that appropriate cartridges are installed correctly to support the desired product. Cartridges come preloaded with ingredient information whose identity is loaded to its corresponding RFID/NFC tag for automatic detection from the sensors by the device. In one embodiment, cartridge installation is detected by an ejection spring linked to a photo interrupter. In a preferred embodiment, the correct cartridge placement is identified by physical means such as a unique coupling method for each cartridge type or by corresponding labels such as unique names or colors. There may also be different connectors for each cartridge so that only appropriate cartridges The controller comprises a microprocessor embedded control mainframe unit that may be optionally controlled wirelessly via Bluetooth, WIFI, or other common means of wireless communication. In various embodiments, system controls and user inputs may be both wireless, or integrated, or both. The control unit has switch outputs to drive electromechanical components such as pumps and valves. The control unit can accept quantity-based ingredient formulations. It executes the formula by simultaneously driving individual DC motors corresponding to specific cartridges. In the preferred embodiment, the control unit will run each motor for a specified amount of time depending on the output required of each ingredient. The motors, in turn, will drive designated pumps to allow flow of the correct volume of each ingredient. The designated cartridge may be mapped for location and proper positioning within the device by RFID/NFC system feedback in one embodiment.

In operation, after transmission of commands to the control unit, ingredients are transmitted via pumps in prescribed amounts from one or more ingredient cartridges into a mixing container that is separate from the device and placed under the outlet nozzles. Pumps are rated to dispense ingredients of varying viscosities at microliter volumes with a high degree of accuracy and reproducibility. As such, only certain types of micro pumps are appropriate for such use. In one embodiment, the pumps may comprise one of many types of microfluid mechanical pumps such as rotary pumps (e.g., internal gear pumps) or reciprocating pumps (e.g., micro piston/micro linear pumps). In an alternate embodiment, non-mechanical pumps (e.g., electro-hydrodynamic or electro-osmotic pumps) are used. In the preferred embodiment, rotary gear pumps are driven by DC motors.

In the preferred embodiment, the ingredients are independently deposited into a discrete mixing and storage container placed on a base under the outlet nozzles. The mixing container is completely detached from the device body. In one embodiment, a switch integrated into the enclosure can detect the correct placement of the container. If the container is not placed on the base or directly under the nozzles, a warning would alert the user to place or align the container correctly and would not dispense until corrected. This technology can include a mechanical or electrical switch as well as an electric sensor such as magnetic, proximity, photo interrupter, etc. After deposition of the appropriate ingredients, the contents of the container are mixed. Various mixing methods are possible in which shaking, vibration, rotation, gyroscopic movement, or other form of motion is applied in order to obtain sufficient mixing of component ingredients. In one embodiment, the storage container may contain a pre-loaded quantity of base material. In another embodiment, the container may include a pre-loaded mixing device, such as fins, blades, mixing balls, or other forms of mixing mechanisms sufficient to create agitation.

In normal operation, at the time of dispensing, one or more motors controlling the pumps may execute a partial reverse rotation or 'suck back' to avoid dripping, drying, or encrustation of fluid within the dispensing nozzle. An advantage of the preferred embodiment is complete isolation of the fluid path for each cartridge. As such, there is no need for a cleaning or flush cycle between dispense cycles and no risk of contamination of one cartridge's fluid path with the contents of any other adjacent cartridge.

The software application comprises the user device control interface. Multiple users can create accounts and log in to a single device. The software application saves user account information and interfaces with the company website to allow for automated order fulfillment, payment processing, customer service interaction, direct marketing touch points, etc. User-saved preferences for custom created formulations are stored through the software application. These may be uploaded and shared with the user community through the software application or via common social media websites. Daily use of the software application is designed to be as user-friendly as possible with one-touch dispensing of the desired formula. Formulas may also be easily updated and saved and adapted for frequent changes as desired. The software application menu may limit or adjust available formulas based on the ingredients currently loaded into the ingredient carousel. The electronic tagging of ingredient cartridges facilitates unique identification of ingredients to allow for easy inventory control and to avoid cross contamination of ingredients. In various embodiments, these system controls may be wireless, integrated, or both. In one embodiment, as the control board determines the identity of each loaded cartridge, this information is mapped and relayed to the software application, which can then update the menu based on ingredients currently available. This affords accurate real-time monitoring of current inventory. In an alternate embodiment, real-time monitoring of remaining cartridge contents is determined by a counter that counts the run time of each motor driver, estimates the ingredient volume remaining, and relays such information to the software. If users select an ingredient during new product formulation for which ingredients are not presently available, an alert will be issued and the user will be prompted to either order the ingredient or change the formula. If, at any point during operation, a cartridge becomes empty or is disconnected, the control board will trigger an alert.

Figure 5:
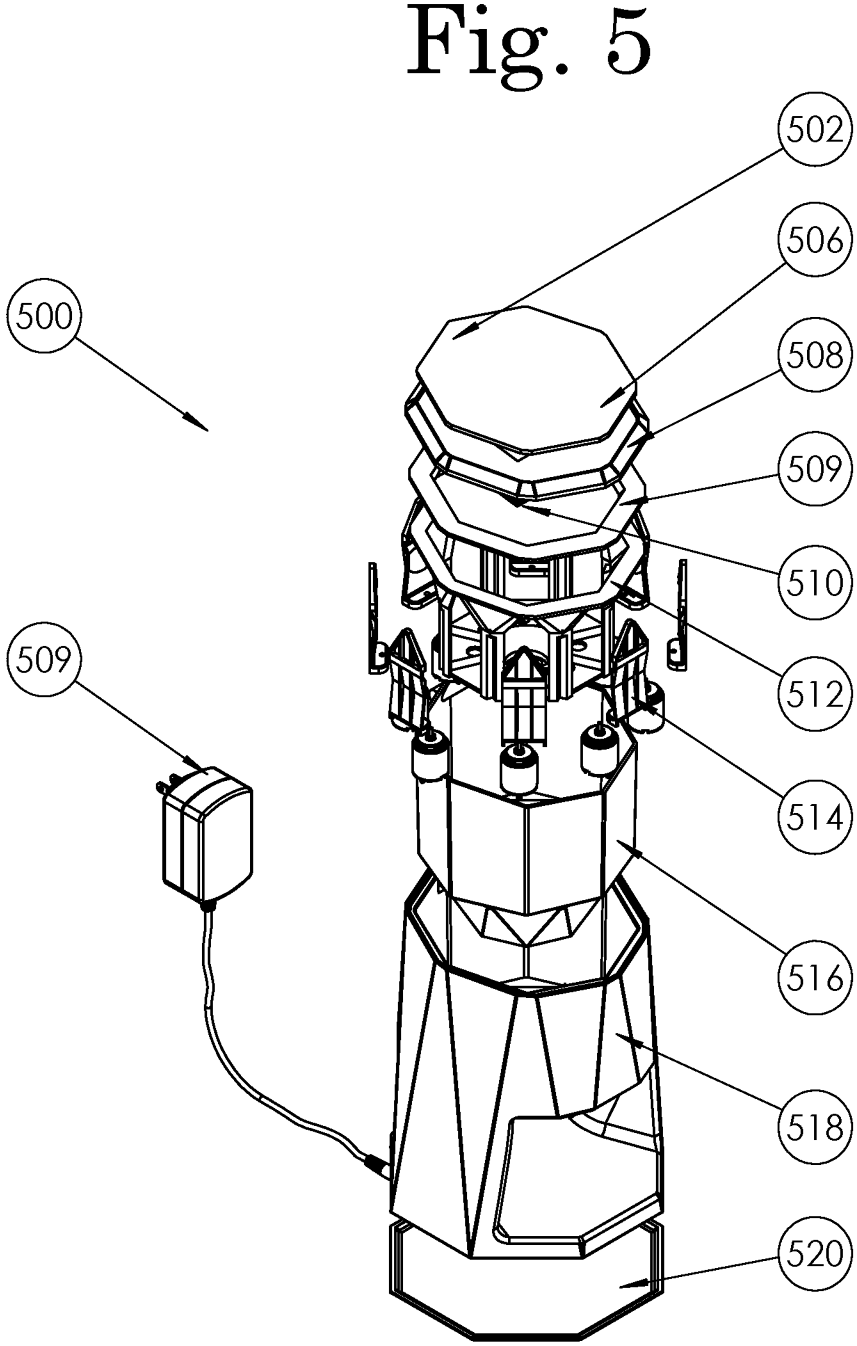
FIG. 5 is an exploded perspective view of the dispensing device of the present invention with an external power source and a display screen.

FIG. 5 is an exploded perspective view of the dispensing device of the present invention 500 with an external power source 520 and a display screen 509. Also shown are a user input control 502 with a support ring 504 set into a top cover plate 506, which is further set onto an intermediate support plate 508. A display screen 509 is oriented to be viewed through the top cover plate 506 and the intermediate support plate 508. These elements are carried on a base support plate 510. Below the base support plate 510 is a cartridge support frame 512 having cartridge support elements or clips 514. The cartridge support elements or clips 514 are further supported on frame segment 516 which further engages a lower frame support 518. There is an external power (electrical) connector 519 (that may directly power motors or pumps (not shown) or power rechargeable batteries (not shown). The internal support plate 520 where removable compartments/bowls (not shown) are supported.

Figure 6:
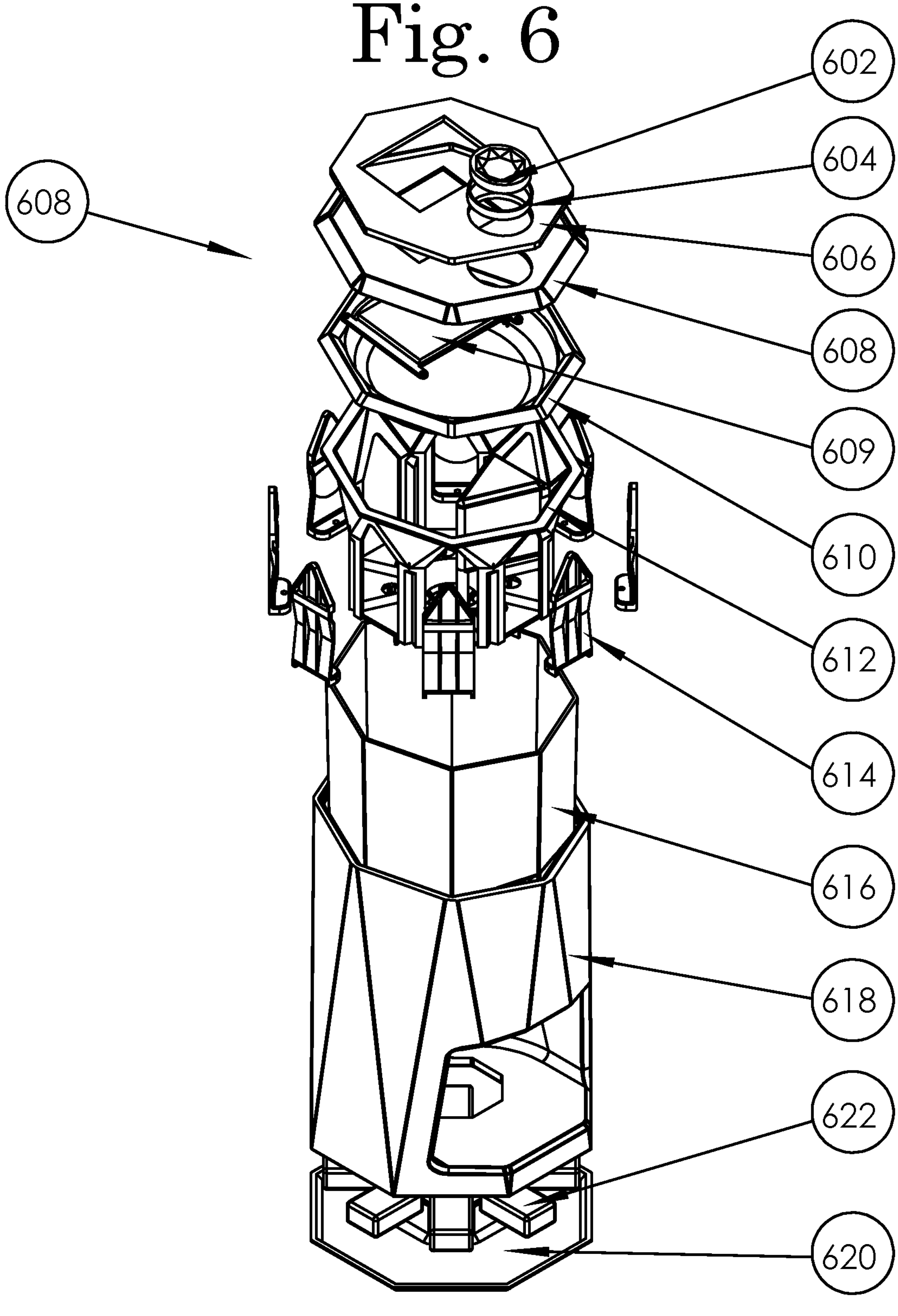
FIG. 6 is an exploded perspective view of the dispensing device of the present invention with an internal power source and a display screen.

FIG. 6 is an exploded perspective view of the dispensing device of the present invention 600 with an internal power source and a display screen. Also shown are a user input control 602 with a support ring 604 set into a top cover plate 606, which is further set onto an intermediate support plate 608. A display screen 609 is oriented to be viewed through the top cover plate 606 and the intermediate support plate 608. These elements are carried on a base support plate 610. Below the base support plate 610 is a cartridge support frame 112 having cartridge support elements or clips 614. The cartridge support elements or clips 614 are further supported on frame segment 616 which further engages a lower frame support 618. There is an internal power source such as 622 (that may directly power motors or pumps (not shown) and may be batteries of rechargeable batteries. The internal support plate 620 where removable compartments/bowls (not shown) are supported.

The present disclosure may be highly specific in some regards, but the scope of the invention is not limited to specific dimensions or limitations, and terms are assumed to be generic, wherever used in the description.

What is claimed is:

1. A customizing and dispensing device for custom cosmetics comprising: an automated dispenser containing at least two liquid-containing ingredient cartridges, each of the at least two cartridges removably coupled to a motor able to dispense controlled amounts of contained liquid from a respective liquid-containing ingredient cartridge; each coupled motor linked in communication with a processor with memory; at least one user input control; the user input control in communication with the processor to direct activation and control of each coupled motor; the processor having an external input-output wired or wireless communication link engageable with a source of data transmission; the memory configured to store at least one set of instructions to activate motors to dispense specific amounts of the liquid from the respective liquid-containing ingredient cartridges; output piping from each of the respective liquid-containing ingredient cartridges leading to a manually moveable receiving chamber; and at least the output piping and receiving chamber within a housing having surrounding vertical walls, a coupling for supporting the at least two respective liquid-containing ingredient cartridges; a lower support surface to support the moveable receiving chamber, wherein there is a slideable piston engaged within a liquid-containing ingredient cartridges such that activation of the gear pump reduces pressure and withdraws liquid from the liquid-containing ingredient cartridges into respective nozzles and lowering a level of liquid within the liquid-containing ingredient cartridges draws down the slideable piston over the level of liquid ingredient within the liquid-containing ingredient cartridges, and an opening in the surrounding vertical walls enabling manual removal of the removeable receiving chamber.

2. The device of claim 1 wherein the input-output communication is a wireless input-output communication.

3. The device of claim 1 wherein the lower support surface has a flat support surface with non-raised markings to align a bottom of the receiving chamber with an area below the output piping.

4. The device of claim 1 wherein the individual liquid ingredient-containing cartridges are removably engaged with individual motors that cause processor-controlled discharge of the individual liquids.

5. The device of claim 4 wherein the memory stores multiple proportional combinations of the liquids, and the device has a user input control which has selection capability to initiate a single combination of liquids from among the multiple proportional combinations of the liquids.

6. The device of claim 5 wherein the user input control has an alphanumeric display for identifying individual ones of the multiple proportional combinations of the liquids.

7. The device of claim 5 wherein the user input control comprises a button or rotating switch that progresses through the multiple proportional combinations of the liquids.

8. The device of claim 5 wherein a display panel on or in communication with the processor that displays a color for the initiated single combination of liquids.

9. The device of claim 1 wherein the lower support surface has a raised line shaped to block passage of a bottom edge of the receiving chamber with an area below the output piping without surrounding the bottom edge of the receiving chamber.

* * * * *